A. URQUHART.
METHOD OF FORMING WEATHER BOARDING.
APPLICATION FILED JAN. 10, 1908. RENEWED MAY 4, 1909.

925,401.

Patented June 15, 1909.

Witnesses:
Joe. P. Wahler
D. W. Gould.

Inventor
Alexander Urquhart,
By Victor J. Evans.
Attorney

THE NORRIS PETERS CO., WASHINGTON, D. C.

UNITED STATES PATENT OFFICE.

ALEXANDER URQUHART, OF COQUILLE, OREGON.

METHOD OF FORMING WEATHER-BOARDING.

No. 925,401.  Specification of Letters Patent.  Patented June 15, 1909.

Application filed January 10, 1908, Serial No. 410,270. Renewed May 4, 1909. Serial No. 493,935.

*To all whom it may concern:*

Be it known that I, ALEXANDER URQUHART, a citizen of the United States of America, residing at Coquille, in the county of Coos and State of Oregon, have invented new and useful Improvements in Methods of Forming Weather-Boarding, of which the following is a specification.

The invention relates to an improvement in weather boarding, and more particularly to a method of constructing weather boarding of usual form.

The present invention is directed to a method of forming weather boarding so as to insure an accurate fit of the respective boards when in applied position.

The invention will be described more particularly in connection with the accompanying drawings, wherein:—

Figure 1:
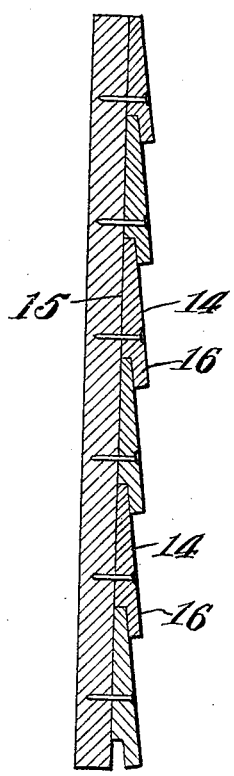
Figure 2:
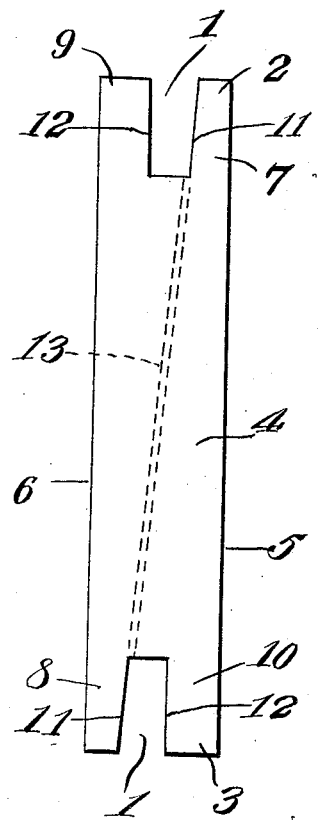

Figure 1 represents a vertical section showing the application of my improved weather boarding, and Fig. 2 is an end elevation of a strip of timber used in forming the weather boarding.

In carrying out the present method I form a longitudinal groove 1 in each of the upper and lower edges 2 and 3 of a rectangular strip of timber 4, of appropriate size. The groove is not centrally arranged with relation to the front and rear surfaces 5 and 6 of the strip, but is offset from the central line, the upper groove being arranged closer to the front face 5 of the strip and the lower groove being arranged closer to the rear face 6, that is to say that the forward wall 7 of the upper groove and the rear wall 8 of the lower groove are of less thickness than the opposing walls 9 and 10 of the respective grooves. Furthermore, the inner surfaces of the respective walls of each groove are not in parallel relation, the inner surfaces of each of the thinner walls 7 and 8 of the respective grooves being inclined from their free edges in a direction away from the opposing face of the strip 4, that is to say the inner surfaces 11 of each thin wall of the respective grooves incline on a line extending diagonally of the strip 4. The inner surface 12 of the opposing or thicker walls is preferably parallel with the proximate surface of the strip. With the strip 4 thus formed I saw said strip on a line 13, extending from one groove to the other through the body of the strip and meeting the inclined wall of each groove, the cut of the saw opening through the base of each groove in alinement with the inclined wall thereof. By this method of forming the weather board each strip is divided into two boards, each having an inclined face 14 which is equal in width to the full width of the original strip 4, a plane or straight face 15 designed to fit against the studding of the stretcher, and a projection 16 which extends from the thicker end of the board and forms with the end of the board a shoulder to receive the thinner end of the next lower board in securing the boards in place.

The essential features of the present method are in offsetting the grooves 1 from the center of the edges of the strip, and in forming the opposing walls in each of the respective grooves on an incline in direct correspondence and alinement with the incline of the cut severing the strip into the two weather boards. By offsetting the groove from the center I am enabled to provide a thorough matching of the weather boards, as I thereby provide a comparatively thin edge of the timber when formed into a weather board which will fit in the shoulder of the thicker end of the next weather board, whereas if the walls of the groove were of the same thickness, this matching would not be possible. Again by forming the opposing walls of the respective grooves on the incline corresponding to the saw cut, the walls of the groove which form the outer surfaces of the weather boarding when in completed form, are not engaged at all by the saw, and, therefore, all marring at this point is avoided and a tight joint is formed with the next overlying board. In this connection it is to be understood that the grooves in the rectangular strip are formed by the usual channeling machine changed only to give one wall the desired incline. This fact is noted in order that the object of the invention may be more thoroughly appreciated, as by such channeling machine it will be understood that the walls of the groove are left smooth and clean, and are, therefore, adapted to form a most perfect joint in assembling the weather boarding. Hence it is of vital importance to avoid disturbing this condition of the surface and it is to this end that the present invention is primarily directed.

Having thus described the invention what is claimed as new, is:—

1. The herein described method of making weather boarding consisting in longitudinally grooving the upper and lower edges of a rectangular strip of timber, the respective grooves being oppositely offset from the center of the grooved edges to provide one wall of each of said grooves thicker than the opposing wall, the additional walls of each groove having their inner surfaces inclined in alinement with each other, and separating the strip by a saw cut extending through the strip in alinement with the inclined surfaces of the thin walls of the grooves.

2. The herein described method of making weather boarding consisting in longitudinally grooving the upper and lower edges of a rectangular strip of timber, said grooves being oppositely offset from the center of the grooved edges to provide a thick and a thin wall for each groove, the thin wall of each groove being inclined outward on its inner surface, the inclined surface of the respective thin walls being alined diagonally of the strip and separating the strip by a line of cut extending from one thin wall to the other and being inclined in alinement with the inclined surfaces of the thin walls.

3. The herein described method of making weather boarding consisting in longitudinally grooving the upper and lower edges of a rectangular strip of timber, said grooves being oppositely offset from the center of the grooved edges to provide a thick and a thin wall for each groove, the thin walls being arranged in diagonally opposing positions at the opposite edges of the strip.

In testimony whereof I affix my signature in presence of two witnesses.

ALEXANDER URQUHART.

Witnesses:
W. C. CHASE,
B. B. PAULL.